Oct. 28, 1930.  G. L. GAY  1,779,876
BLADE OILER FOR DOUGH DIVIDERS
Filed Oct. 22, 1928
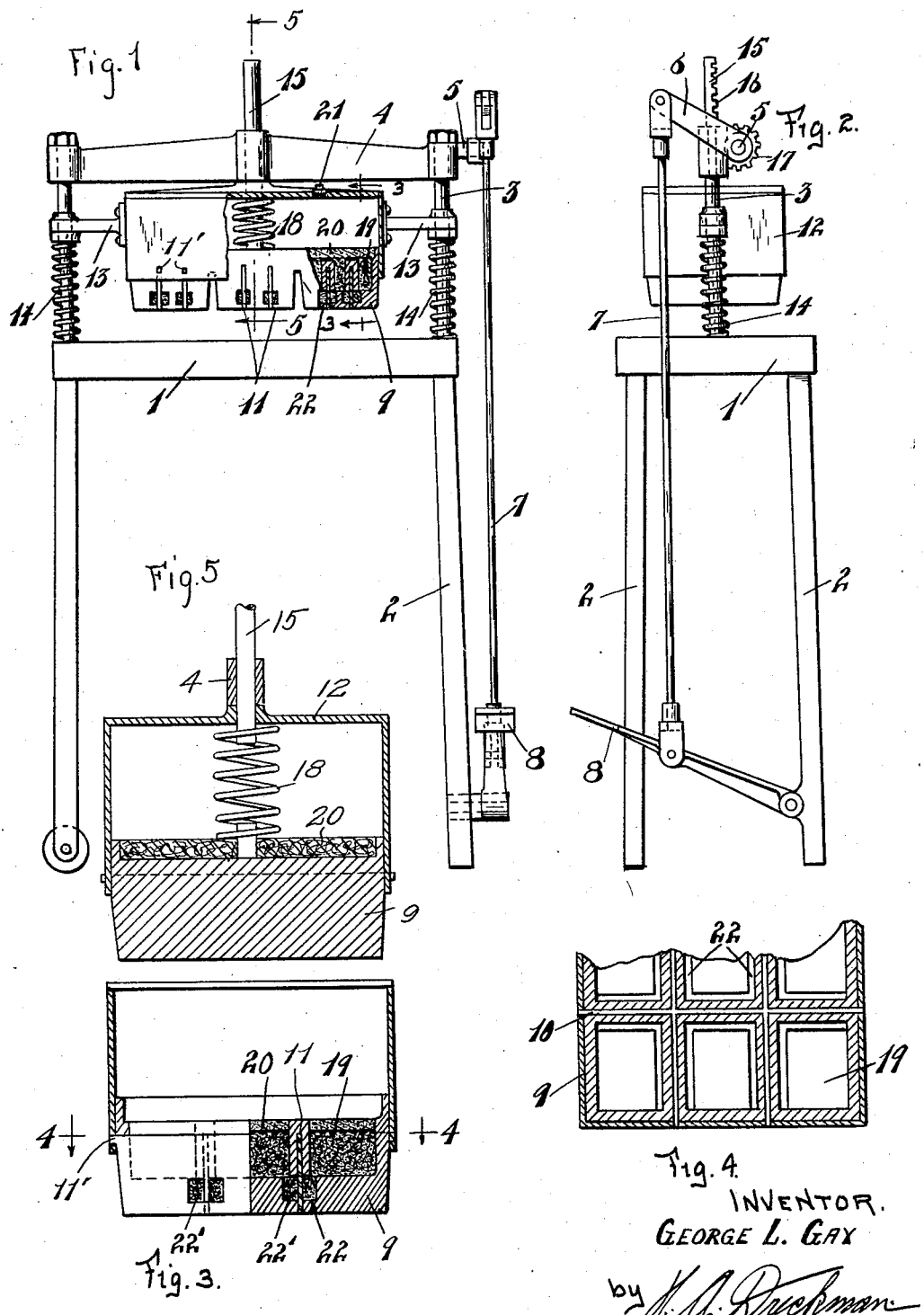
INVENTOR.
GEORGE L. GAY
ATTORNEY.

Patented Oct. 28, 1930

1,779,876

UNITED STATES PATENT OFFICE

GEORGE L. GAY, OF LONG BEACH, CALIFORNIA

BLADE OILER FOR DOUGH DIVIDERS

Application filed October 22, 1928. Serial No. 314,114.

This invention relates to dividers for dough, or the like, and particularly to a means for oiling the blades or knives which separate the dough so that it can be readily separated for further working, or breaks more readily when baked. This invention is particularly adapted for machines which divide the dough in a pan or pans to make biscuits, and the like. Heretofore, it has been the practice to spread oil on the top of the dough and then cut it but this practice caused an unsatisfactory gray color on the top of the baked biscuits which was unsightly.

An object of my invention is to oil the blade as it enters the dough, thus more effectively carrying the oil into the crease thus formed and eliminating the unsatisfactory gray color on the top of the biscuits.

Another object is to automatically grease the blades of the dough divider as they reciprocate in the machine.

Still another object is to provide a machine of the character stated which is simple in construction, effective in operation, and which requires a minimum of attention.

Other objects, advantages, and features of invention may appear from the accompanying drawing, the subjoined detailed description, and the appended claims.

In the drawing

Figure 1 is a side elevation of my machine with parts broken away to show interior construction.

Figure 2 is an end view of the same.

Figure 3 is a sectional view taken on line 3, 3 of Figure 1.

Figure 4 is a sectional view taken on line 4, 4 of Figure 3.

Figure 5 is a sectional view taken on line 5—5 of Figure 1.

Referring more particularly to the drawing, the numeral 1 indicates the platform of my machine which may or may not be mounted upon legs 2. A pair of posts 3, 3 rise from the platform 1 and are rigidly secured therein. A cross-head 4 extends between the posts 3, 3 and is suitably secured to the top thereof. A rock shaft 5 is journaled in the cross-head 4 and is rocked through the medium of an arm 6 and a link 7 pivoted thereto, which link extends to a foot treadle 8 pivotally mounted on the legs.

A grillage frame 9 comprises a plurality of intersecting slots 10 therein in which blades 11 are adapted to fit. The slots extend from the bottom upwardly, but not entirely through the frame. The blades 11 extend through the slots in the side walls of the frame 9 and are secured to a housing 12. Said housing fits over the frame 9 and is slidable thereon. The blades are secured to the housing at the top thereof as shown at 11'. A pair of plates 13 are secured to either side of the housing 12 and are provided with a hole through which the posts 3, 3 extend. Springs 14, 14 encircle the post 3 and bear against the bottom of the plates 13, thus yieldably urging the housing upwardly.

A shaft 15 rises from the housing 12 to which it is secured and extends through the cross-head 4. A rack 16 is cut on the shaft and a gear 17 on the rock shaft 5 meshes with the rack whereby the frame 9 is carried downwardly when the treadle 8 is depressed. A spring 18 encircles the shaft 15 and is positioned between the top of the frame 9 and the housing 12, thus yieldably urging the housing upwardly away from the frame. The spring also holds the blades 11 against the top of the grooves in the frame 9 until the frame engages the top surface of the dough in the pan. Then the frame is held against downward movement by the housing 12 which is depressed further, thus moving the blades into the dough.

The frame 9 is provided with reservoir spaces 19 around the slots 10 and these spaces are filled with cotton or other fabric so that a quantity of oil will be retained therein. A felt pad 20 fits over the top of the frame 9, which pad is saturated with oil from an inlet plug 21 in the housing 12. Packing spaces 22 are provided in the frame 9 on both sides of the blades 11 and adjacent the lower edges of the blades. Packing 22' is provided in the spaces 22 and this packing is saturated with oil from the spaces 19. Thus it will be evident that the oil will move to the packing 22' and will flow onto the blades 11 at the bottom thereof so that as the blades move downwardly out of the frame they will be saturated with oil, and this oil will be carried into the dough.

The operation of my invention will be evident from the foregoing description, in that, as the treadle 8 is depressed the frame 9 and housing 12 will be carried downwardly until the frame engages the dough in the pan. Further depression of the treadle 8 will move the blades or knives 11 downwardly through the dough but the frame 9 remains stationary and these blades at each reciprocation will be covered with a coating of oil which is carried into the creases of the dough. The knives are all secured to the housing 12 as shown at 11' and are actuated by the housing, that is, they are projected below the frame 9 against the tension of the spring 18 by the further depression of the treadle 8 and the further downward movement of the shaft 15 and housing 12.

Having described my invention, I claim:

1. In a dough dividing machine, a grillage frame, a plurality of blades in said frame, said blades being adapted to move downwardly and outwardly of the frame, a housing extending over the frame, means securing said blades to the housing, means to depress said housing whereby the blades are moved out of the grillage frame, said grillage frame having oil reservoir spaces therein around said blades, said spaces extending to the blades whereby oil is carried to the blades as they reciprocate.

2. In a dough dividing machine, a grillage frame, a plurality of blades in said frame, said blades being adapted to move downwardly and outwardly of the frame, a housing extending over the frame, means securing said blades to the housing, means to depress said housing whereby the blades are moved out of the grillage frame, said grillage frame having oil reservoir spaces therein around said blades, a fiber packing in said reservoir spaces, said grillage frame having packing spaces on both sides of the blades and adjacent the bottom of the blades, packing in said packing spaces, said packing being adapted to receive oil from the fiber in the reservoir spaces.

3. In a dough dividing machine, a grillage frame, a plurality of blades in said frame, said blades being adapted to move downwardly and outwardly of the frame, a housing extending over the frame, means securing said blades to the housing, means to depress said housing whereby the blades are moved out of the grillage frame, said grillage frame having oil reservoir spaces therein, around said blades, a fiber packing in said reservoir spaces, said grillage frame having packing spaces on both sides of the blades and adjacent the bottom of the blades, packing in said packing spaces, said packing being adapted to receive oil from the fiber in the reservoir spaces, a felt pad extending over all the reservoir spaces in the grillage frame, and a filler plug in the housing through which oil is poured onto the felt pad.

In testimony whereof, I affix my signature.

GEORGE L. GAY.